United States Patent
Hewuse

[11] Patent Number: 5,469,935
[45] Date of Patent: Nov. 28, 1995

[54] OIL FILTER REMOVAL AID

[76] Inventor: Monte P. Hewuse, Box 62, 2085 Highway 80, Babcock, Wis. 54413

[21] Appl. No.: 299,455
[22] Filed: Sep. 1, 1994
[51] Int. Cl.⁶ ........................................................ F16C 3/14
[52] U.S. Cl. .............................. 184/1.5; 141/86; 141/88; 210/238
[58] Field of Search .............................. 184/1.5; 141/86, 141/87, 88, 98; 210/238, 248

[56] References Cited

U.S. PATENT DOCUMENTS

| | | | |
|---|---|---|---|
| 3,710,930 | 1/1973 | Owpom | 210/238 |
| 4,020,922 | 5/1977 | Klasel . | |
| 4,266,452 | 5/1981 | Crist . | |
| 4,376,703 | 3/1983 | Krauss | 210/248 |
| 4,451,368 | 5/1984 | Pawdelena | 210/238 |
| 4,865,727 | 9/1989 | Krauss . | |
| 4,867,017 | 9/1989 | Holman . | |
| 5,000,847 | 3/1991 | Huang | 210/238 |
| 5,169,541 | 12/1992 | Wells | 141/86 |
| 5,366,084 | 11/1994 | Post | 210/248 |

FOREIGN PATENT DOCUMENTS 2273061  6/1994  United Kingdom ...................... 141/87

Primary Examiner—Thomas E. Denion
Attorney, Agent, or Firm—Ryan, Maki & Hohenfeldt

[57] ABSTRACT

A device for preventing leakage and spillage of fluids from a canister type oil filter during removal thereof from an engine block is in the form of an annular elastomeric sleeve having an upper end and a lower end. The upper end has an opening adapted to fit over the exterior of an oil filter. The bottom end of the sleeve has an opening of lesser diameter than that of the upper end and the body of the sleeve adjacent the lower end has smooth contours and is of increased thickness relative to the body of the sleeve. A plurality of protrusions extend inwardly from the inner surface of the shape positioned circumferentially around the shape and are located between the upper and lower ends thereof.

5 Claims, 2 Drawing Sheets

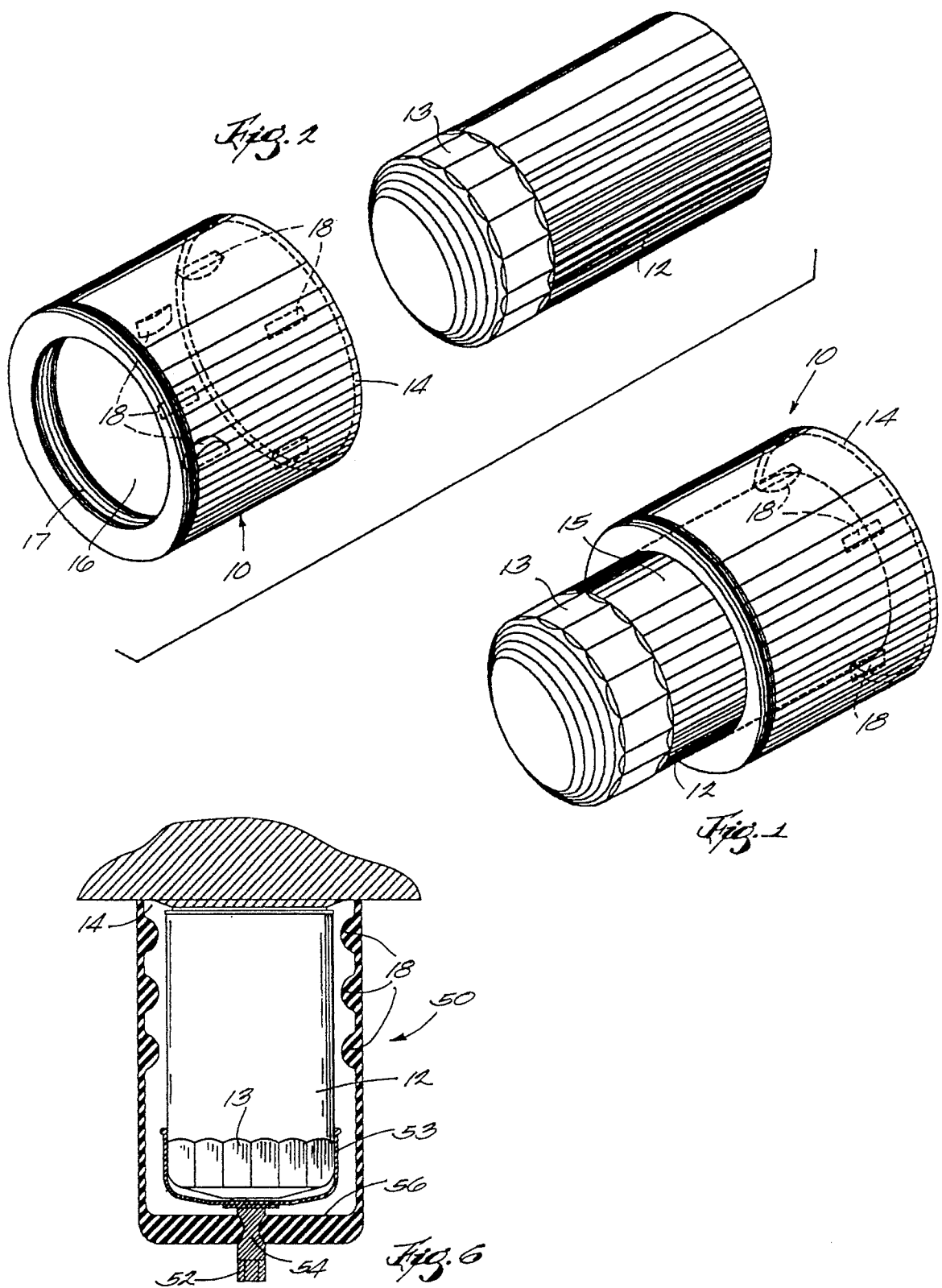

OIL FILTER REMOVAL AID

FIELD OF THE INVENTION

The present invention relates to devices for preventing spilling and leakage of oil during removal of canister type oil filters from engines and, more specifically, to a device that can be fitted over a variety of canister-type filter bodies and which permits the use thereon of conventional filter removal wrenches when the device is in place.

BACKGROUND OF THE INVENTION

Various devices have been proposed to assist home auto mechanics in their removal of oil filters from automotive engines to eliminate dripping and spilling of oil onto the ground or garage floor. Spillage often results in the oil running down the arm of the mechanic and soiling his clothing and also causes detrimental environmental pollution. Various past proposals to eliminate this problem have included combining of wrenches with oil catching devices, for example as shown in U.S. Pat. Nos. 4,867,017, 4,266,452 and 4,865,727. Another solution has been to provide a leak proof plastic bag to receive the filter and act as a disposal container. See U.S. Pat. No. 4,020,922.

A problem that has persisted in the use of the foregoing devices is that although the devices catch oil when intact, they do not permit the use of conventional wrenches therewith, thus leaving the mechanic with the requirement to use a plastic wrench, which may not always be effective.

SUMMARY OF THE INVENTION

It is a principle purpose of the present invention to provide a device for capturing of oil spills and leaks which occur during removal of oil filters from engines. In accordance with an important aspect of the invention, the device in the form of a sleeve that is stretched over the outside of the filter. In accordance with a related aspect, the sleeve is of an elastomeric composition, that forms a fluid tight seal over the filter body.

A yet further aspect relates to the fact that when the device is in place over the filter, the wrench grips of the filter and the entire lower part of the filter are accessible for use by either a special wrench designed to fit over the wrench grips on the filter body or to engage the smooth cylinder of the body to allow rotation thereof for removal from the engine block.

In accordance with a further aspect of the invention, the device can be formed of a one piece molded elastomeric or rubber body, preferably a sleeve.

In accordance with a still related aspect of the invention, the inner surface of the sleeve is provided with projections that engage the outside of the filter body and maintain a space between the body of the filter and the interior of the sleeve so that oil can run down the inside of the sleeve. In accordance with a still further related aspect, the bottom of the sleeve is of an enlarged thickness, preferably having smooth rounded contours so that it forms a tight seal, in the nature of an "O-ring" which tightly seals the bottom of the device to the filter body.

In accordance with a further, different embodiment of the invention, the sleeve can be shaped so that the bottom end has an opening of much smaller diameter adapted to fit on the neck of a filter removal wrench, so that the sleeve fits over the wrench which is then placed over the filter body.

Briefly, the invention provides a device for preventing leakage and spillage of fluids from a canister type oil filter during removal thereof from an engine block in the form of an annular elastomeric sleeve having an upper end and a lower end. The upper end has an opening adapted to fit over the exterior of an oil filter. The bottom end of the sleeve has an opening of lesser diameter than that of the upper end and the body of the sleeve adjacent the lower end has smooth contours and is of increased thickness relative to the body of the sleeve. A plurality of protrusions extend inwardly from the inner surface of the shape positioned circumferentially around the shape and are located between the upper and lower ends thereof.

Further objects and advantages of the invention will be apparent from the following detailed description, claims and accompanying drawings wherein:

BRIEF DESCRIPTION OF DRAWINGS

FIG. 1 is a perspective view showing an oil filter with a device of this invention placed thereover;

FIG. 2 is a perspective view of the filter and device combination shown in FIG. 1 with the device removed from the filter;

DETAILED DESCRIPTION OF PREFERRED EMBODIMENTS

Figure 4:
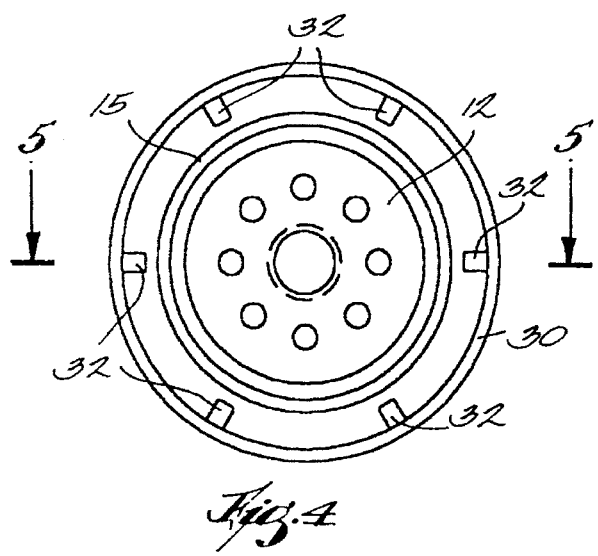
FIG. 4 is a top view of the device and filter combination shown in FIG. 3.

Referring more particularly to the drawings, an oil catching device of this invention is generally referred to by numeral 10. Device 10 is in the form of a sleeve adapted to fit over an oil filter housing 12. Sleeve 10 is open at its upper end 14 which is adapted to fit over the filter housing body and a lower end 16 which has a thickened rim 17 preferably of rounded configuration so that it tightly engages and forms a fluid tight seal over the outside of body 12. As best seen in FIG. 1, housing 12 is provided at its bottom and with wrench receiving angular portions 13. It will be noted in FIG. 1 that wrench receiving portion 13 is fully accessible when the sleeve 10 of this invention is in place over the body of filter 12. Also, a cylindrical portion 15 of filter housing 12 is accessible so that a clamp type wrench may optionally be utilized, if desired. A plurality of projections 18 are formed on the inner surface of sleeve 10 and serve to space the inner surface of the sleeve away from the outer surface of housing 12. This permits oil to run down inside of the sleeve if it is present or flowing on the outside of filter housing 12 as the housing 12 is rotated loose from the connective coupling located on the engine.

Figure 5:
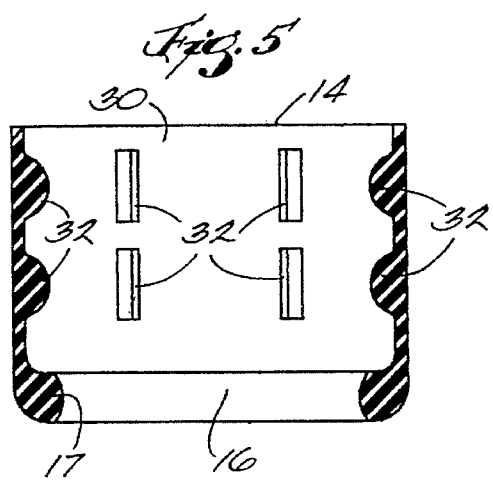
FIG. 5 is a sectional view showing the device only and taken along line 5—5 of FIG. 4; and, FIG. 6 is a central sectional view showing a different embodiment of the invention.
Figure 3:
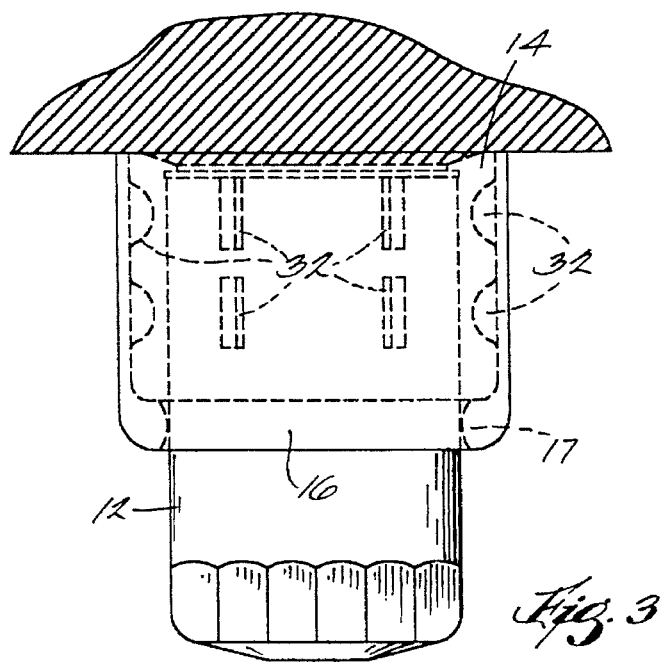
FIG. 3 is a side elevational view of a modified embodiment of the invention showing interior parts by means of phantom lines.

A somewhat modified embodiment of the invention is shown in FIGS. 3–5. In this embodiment a sleeve 30 is provided with elongated inner projections 32, greater in number and length, which serve to space a greater percentage of the interior of the sleeve away from the outer surface of canister 12 as seen in FIG. 4. Note, in FIG. 3 that thickened portion 17 of the bottom end of the sleeve 16 in effect forms a sealing "O-ring" type of configuration that is effective in providing a fluid tight seal.

FIG. 6 illustrates a still further embodiment of the invention wherein a spill catching sleeve 50 is provided with a configuration such that it fits over the oil filter cartridge 12 and a filter engaging socket wrench of conventional design 52 having an angular socket 53 which matingly engages the angular end 13 of filter housing 12. Socket 53 of wrench 52 is attached to a stem 51 which has a necked down portion 54 which is adapted to receive sealingly, and opening in the otherwise nearly closed bottom end 56 of sleeve 50. The opening is configured so that it fits tightly into the necked portion 54 of the wrench and thus forms a fluid tight seal. It will, thus, be appreciated that in the use of this embodiment, the use of the conventional wrench is enabled while still obtaining the benefits of the invention. As in the case of the earlier described embodiments, projections 18 (or 32) are provided in order to maintain a space between the outside of the filter housing 12 and the inside of sleeve 50 to allow fluid drainage therein.

The sleeve of the present invention can be formed of any tough elastic material. Preferably the sleeve is formed of a molded rubber. However, the sleeve may be formed of any tough elastomeric polymer, as will be appreciated by those skilled in the art. In practice, the sleeves of the present invention can be provided in several diameters and dimensions such that a sufficient variety of sleeves is provided so that commercially available conventional automotive filters can be removed using the invention.

While specific embodiments of the invention have been shown for purposes of illustration, it will be apparent to those skilled in the art that numerous other modifications can be made without departing from the spirit of the invention. Thus, the true scope of the appended claims should include reasonable equivalents of the structures recited therein.

What is claimed is:

1. A device for preventing leakage and spillage of fluids from a canister type oil filter during removal thereof from an engine comprising an annular elastomeric sleeve having an upper end and a lower end, said upper end having an opening adapted to fit over the exterior of an oil filter, the lower end of said sleeve having an opening of lesser diameter than that of the upper end, and having smooth contours said opening in the lower end of said sleeve being of a diameter adapted to fit tightly over a stem of a socket type filter removal wrench, said wrench having an axially oriented stem and an angular socket, adapted to matingly engage an angular end of said canister type filter, said socket being attached to said stem, a plurality of protrusions extending inwardly from the inner surface of said shape positioned circumferentially around said shape and located between the upper and lower ends thereof.

2. A device according to claim 1 wherein said protrusions are of an elongated configuration with a longest dimension oriented parallel to the axis of said sleeve.

3. A device according to claim 1 wherein said opening in the lower end of said sleeve is of a diameter adapted to tightly engage the exterior of a section of said stem having a reduced diameter relative to the body of said stem.

4. A device according to claim 1 wherein said lower end of said sleeve is of a thickness greater than that of the remainder of said sleeve.

5. A device according to claim 1 wherein of said sleeve is formed of a molded rubber material.

* * * * *